United States Patent
Sambandan et al.

(10) Patent No.: US 9,555,406 B2
(45) Date of Patent: Jan. 31, 2017

(54) METHOD FOR FORMING AN OXIDE COATED SUBSTRATE

(71) Applicant: Nitto Denko Corporation, Osaka (JP)

(72) Inventors: Ekambaram Sambandan, Carlsbad, CA (US); Rajesh Mukherjee, Irvine, CA (US); Takuya Fukumura, Carlsbad, CA (US); Amane Mochizuki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 14/759,610

(22) PCT Filed: Jan. 3, 2014

(86) PCT No.: PCT/US2014/010201
§ 371 (c)(1),
(2) Date: Jul. 7, 2015

(87) PCT Pub. No.: WO2014/107591
PCT Pub. Date: Jul. 10, 2014

(65) Prior Publication Data
US 2015/0343434 A1 Dec. 3, 2015

Related U.S. Application Data

(60) Provisional application No. 61/749,815, filed on Jan. 7, 2013.

(51) Int. Cl.
*B01J 37/08* (2006.01)
*B01J 37/12* (2006.01)
(Continued)

(52) U.S. Cl.
CPC ......... *B01J 37/0215* (2013.01); *B01J 21/063* (2013.01); *B01J 21/12* (2013.01);
(Continued)

(58) Field of Classification Search
CPC ......... B01J 21/063; B01J 21/066; B01J 23/14; B01J 27/24; B01J 27/25; B01J 31/2239; B01J 35/006; B01J 37/00; B01J 37/0215; B01J 37/0219; B01J 37/08; B01J 37/086; B01J 37/12; C01G 23/053; C04B 41/5041; C04B 41/009
(Continued)

(56) References Cited

U.S. PATENT DOCUMENTS

2009/0297804 A1* 12/2009 Paul ............... C01G 23/006
428/210
2011/0312080 A1* 12/2011 Hatton ............... A61L 27/40
435/289.1

(Continued)

FOREIGN PATENT DOCUMENTS

CN 101024170 A 8/2007
CN 101659519 * 3/2010 ............. C03C 17/00
(Continued)

OTHER PUBLICATIONS

"One-step fabrication of N-doped TiO2 inverse opal films with visible light photocatalytic activity," Zhiyan Hu et al. Catalysis Communications 40 (2013), pp. 106-110.*

(Continued)

*Primary Examiner* — Patricia L Hailey
(74) *Attorney, Agent, or Firm* — K&L Gates LLP; Louis C. Cullman; Brent A. Johnson

(57) ABSTRACT

A method for forming an oxide coated substrate comprising heating a pre-coating mixture in the presence of a substrate to synthesize an oxide coating on the substrate. The pre-coating mixture comprises a solubilized reducing additive, a solubilized oxidizing additive, and the substrate. The heating is conducted at a temperature sufficiently high enough to exothermically react the solubilized reducing additive and (Continued)

solubilized oxidizing additive and low enough to control the phase and composition of the oxide.

20 Claims, 5 Drawing Sheets

(51) Int. Cl.
| | |
|---|---|
| C01G 23/053 | (2006.01) |
| B01J 37/02 | (2006.01) |
| B01J 31/22 | (2006.01) |
| B01J 27/25 | (2006.01) |
| B01J 21/12 | (2006.01) |
| B01J 35/00 | (2006.01) |
| C04B 41/00 | (2006.01) |
| C04B 41/50 | (2006.01) |
| C01B 21/082 | (2006.01) |
| B01J 21/06 | (2006.01) |
| B01J 23/14 | (2006.01) |
| B01J 27/24 | (2006.01) |
| C04B 111/00 | (2006.01) |

(52) U.S. Cl.
CPC ............... *B01J 23/14* (2013.01); *B01J 27/24* (2013.01); *B01J 27/25* (2013.01); *B01J 31/2239* (2013.01); *B01J 35/004* (2013.01); *B01J 37/0219* (2013.01); *B01J 37/08* (2013.01); *B01J 37/086* (2013.01); *C01B 21/0828* (2013.01); *C01G 23/053* (2013.01); *C04B 41/009* (2013.01); *C04B 41/5041* (2013.01); *B01J 37/0217* (2013.01); *C01P 2002/30* (2013.01); *C01P 2002/54* (2013.01); *C01P 2002/72* (2013.01); *C04B 2111/00827* (2013.01)

(58) Field of Classification Search
USPC .................... 502/162, 164, 171, 309, 350
See application file for complete search history.

(56) References Cited

U.S. PATENT DOCUMENTS

| | | | | |
|---|---|---|---|---|
| 2012/0161090 A1* | 6/2012 | Zhu | .................... | C01G 23/047 252/587 |
| 2012/0267321 A1* | 10/2012 | Kisailus | .................. | C01G 1/00 210/748.09 |
| 2013/0040129 A1* | 2/2013 | Jin | .......................... | C04B 35/46 428/328 |
| 2014/0045953 A1* | 2/2014 | Daly | .................... | B01J 23/8913 518/714 |
| 2015/0018439 A1* | 1/2015 | Daly | ....................... | B01J 37/18 518/728 |

FOREIGN PATENT DOCUMENTS

| | | | | |
|---|---|---|---|---|
| CN | 102755893 | | 10/2012 | |
| DE | 101 63 516 A1 | | 6/2003 | |
| DE | 10163516 | * | 6/2003 | ............. C04B 41/45 |
| WO | 2008-009919 A1 | | 1/2008 | |

OTHER PUBLICATIONS

"Size-tunable TiO2 nanocrystals from titanium (IV) bis (ammonium lactato) dihydroxide and towards enhance the performance of dye-sensitized solar cells," Yanmin Hao et al. Electrochimica Acta 117 (2014), pp. 268-275.*
"Titanium dioxide thin films prepared by electrolysis from aqueous solution of titanium-lactic acid complex for dye-sensitized solar cells," Masaya Chigane et al. Thin Solid Films 520 (2012), pp. 3510-3514.*
"Conductive and photovoltaic properties of multilayered ultrathin films designed by layer-by-layer assembly of titanium oxides," Kohji Masuda et al. Thin Solid Films 519 (2011), pp. 2493-2498.*
ISR & Written Opinion for PCT/US2014/010201, mailed Apr. 6, 2014.
Matolygina, D.A., et al., Synthesis of Superfine Titania via High-Temperature Hydrolysis of Titanium(IV) Bis (ammonium lactato) Dihydroxide, Doklay Chemistry, Kluwe Academic Publishers-Plenum Publishers, NE., vol. 441, No. 2, Jan. 5, 2012, pp. 361-364.
Office Action dated Sep. 3, 2016 for Chinese Patent Application 201480004203.6.
Wang, et al "Preparation and Hydrophilicity Evaluation of TiO2 Thin Film with Biomimetic Morphology" Journal of Changzhou University (Natural Science Edition) vol. 24, No. 4, pp. 42-47 (2012).

* cited by examiner

METHOD FOR FORMING AN OXIDE COATED SUBSTRATE

CROSS-REFERENCE TO RELATED APPLICATIONS

This application claims the benefit of U.S. Provisional Application 61/749,815, filed Jan. 7, 2013, which is incorporated by reference in its entirety herein.

BACKGROUND

Description of the Related Art

Photocatalytic materials are useful for fluid purification. However, the use of nanophotocatalyst powders present problems, such as the need to separate the powders from the fluid being treated. Several responses to this problem include loading the photocatalyst material on a support thus easing the separation of the photocatalytic materials from the treated fluid. This can involve methods such as dip-coating, slip-casting etc. Another way is to synthesize magnetically separable photocatalysts. This can involve preparation of core-shell magnetic-photocatalyst composite, and separation of the composite after water purification requires a magnetic field. Both methods involve synthesis of photocatalyst in the first step and followed by coating on required substrate. In addition, such methods may involve expensive instrumentation and chemicals.

Several methods have been proposed for the manufacture of photocatalytically active coatings. Generally, these methods form the powder first and then bind the powder to the desired surface. These methods can have the problem of insufficient adhesion of the powder to the desired substrate. Generally, methods and apparatus to coat a substrate with photocatalytic material include flow based operations, batch processing, polymerization, etc.

SUMMARY

This disclosure is related to methods for affixing inorganic materials to substrates. Some embodiments include a method for forming an oxide coated substrate. The method includes heating a reaction mixture, such as a pre-coating mixture, that comprises materials that can form an oxide material. Any oxide material can be formed, such as an oxide coating for a substrate or a powdered oxide material. This oxide-forming reaction mixture, such as a pre-coating mixture, comprises a solubilized reducing additive and a solubilized oxidizing additive. Additional additives may also be present in the oxide-forming reaction mixture. An oxide-forming reaction mixture, such as a pre-coating mixture, can be heated in the presence of a substrate to synthesize an oxide coating on the substrate. Typically, heating of the oxide-forming reaction mixture is conducted at a temperature sufficiently high to exothermically react the additives and low enough to control the phase and composition of the oxide.

Some embodiments include a method for forming an oxide coated substrate comprising: heating a pre-coating mixture in the presence of a substrate to synthesize an oxide coating on the substrate; wherein the pre-coating mixture comprises a solubilized reducing additive, a solubilized oxidizing additive, and the substrate; and wherein heating is conducted at a temperature sufficiently high to exothermically react the solubilized reducing additive and solubilized oxidizing additive and low enough to control the phase and composition of the oxide.

In some embodiments, a photocatalytic material is affixed to a substrate, enabling ease of separation of the photocatalytic material from the fluid to which the photocatalytic material is exposed.

Some embodiments can enable loading of a photocatalytic material on a three dimensional substrate.

Some embodiments can enable affixation of a temperature sensitive metal oxide, doped or undoped, enabling affixation while substantially reducing the manufacture of undesirable by-products, maintaining the material characteristics of the substrate material, and/or maintaining the doping characteristics of the material. In some embodiments, the oxide material is a non-metallic oxide e.g. silicon dioxide or $Bi_2O_3$. In some embodiments, the oxide material is a metallic oxide e.g. $TiO_2$. In some embodiments, the oxide is non-stoichiometric.

An embodiment includes an in situ method of affixing a catalytic material on a substrate.

An embodiment includes a method for forming an oxide coated substrate comprising contacting a solubilized reducing additive, a solubilized oxidizing additive and a substrate surface; heating the additives and substrate to synthesize an oxide coating thereon, the heating conducted at a temperature sufficiently high enough to exothermically react the additives and low enough to control the phase and composition of the metal oxide.

Some embodiments include an oxide affixed substrate made by any of the methods described herein.

Some embodiments include a method for forming a photocatalytic powder comprising: heating a mixture comprising a solubilized reducing additive and a solubilized oxidizing additive to form an oxide; wherein heating is conducted at a temperature sufficiently high enough to exothermically react the solubilized reducing additive and solubilized oxidizing additive and low enough to control the phase and composition of the oxide.

These and other embodiments are described in greater detail below.

DETAILED DESCRIPTION

Figure 1:
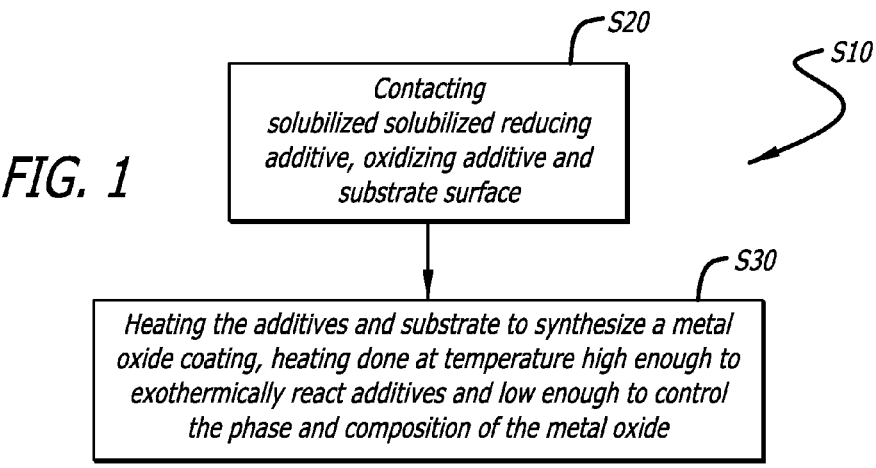
FIG. 1 is a schematic flow-diagram of an embodiment of a method described herein.

Typically, a method includes heating an oxide-forming reaction mixture to synthesize an oxide, such as an oxide coating on a substrate. The components of the oxide-forming reaction mixture, such as a pre-coating mixture, can be heated at any suitable temperature that can result in oxide formation, such as any suitable temperature that can result in coating of the oxide on the substrate. For example, in some embodiments the oxide-forming reaction mixture or pre-coating mixture could be heated at temperature of about 100° C. to about 1500° C., about 100° C. to about 800° C., about 200° C. to about 400° C., at least about 100° C., at least about 200° C., at least about 300° C., up to about 800° C., up to about 600° C., up to about 500° C., up to about 450° C., up to about 400° C., or up to about 375° C., or any temperature in a range bounded, or between, any of these values.

Heat released during the exothermic reaction can enable the reaction to be self propagating once initiated. For example, applying heat at a temperature greater than the flash point of at least one of the additives can initiate the reaction, and, in some instances, heat from the reaction can keep the temperature of the reaction mixture above the flash point. Thus, the reaction can continue without external heating as long as heat from the reaction keeps the temperature of the oxide-forming reaction mixture, such as a pre-coating mixture, above the flash point. In this manner, an exothermic reaction may continue to substantial completion. Such a reaction can be described as a self-propagating low temperature synthesis process. A self-propagating low temperature synthesis may be advantageous over flame synthesis in that it can occur in liquid phase and not the gas phase. Additionally, since self-propagating syntheses can occur at lower temperatures, the desired phase of the metal oxide and/or the nominally desired elements may be easier to maintain. For example, anatase $TiO_2$ is preferred over the rutile phase, since the anatase phase is photocatalytically active, wherein the rutile phase is to a much lesser degree. The application of temperatures above 700° C. increases the amount of rutile phase present in the composite. In some embodiments, the reactions substantially all occur in the liquid phase.

Heating can occur for any suitable time that may allow an oxide, such as an oxide coating on the surface of the substrate, to be formed. In some embodiments the oxide-forming reaction mixture, such as a pre-coating mixture, is heated for about 1 minute to about 400 minutes, about 1 minute to about 40 minutes, about 20 minutes, or for any amount of time in a range bounded by, or between, any of these values.

In some embodiments, the oxide-forming reaction mixture, such as a pre-coating mixture, could be heated at temperature of about 100° C. to about 1500° C., about 100° C. to about 800° C., about 200° C. to about 400° C., less than about 800° C., less than about 600° C., less than about 500° C., less than about 450° C., less than about 400° C., or less than about 375° C., for about 1 minute to about 400 minutes, about 1 minute to about 40 minutes, or about 20 minutes. In some embodiments a substrate free reaction can be performed under the same heating conditions to produce a photocatalytic powder.

It may be helpful if the heating is performed at a smoldering temperature. A smoldering temperature may be sufficiently high so as to exothermically react the additives and low enough to substantially control the phase and composition of the metal oxide. The smoldering temperature can ignite the material to be combusted, which, once ignited, is self-propagating. The smoldering temperature can be 100° C. to about 800° C., about 200° C. to about 400° C., less than about 800° C., less than about 600° C., less than about 500° C., less than about 450° C., less than about 400° C., or less than about 375° C. Smoldering temperature can be affected by factors such as the flash point of the additive materials, and/or the decomposition temperature of the additives. In some embodiments, the smoldering temperature and the resulting reaction temperature are not so high as to change the phase of the resulting material.

In some embodiments the oxidizing additive and/or the reducing additive may not be solubilized.

In some embodiments, a mixture comprising the solubilized oxidizing additive and the solubilized reducing additive can be heated prior to addition of the substrate. In some embodiments this pre-heating can be done at about 90° C. to about 250° C., about 120° C. to about 180° C., or at about 150° C. In some embodiments this pre-heating can be done for a time of about 5 minutes to about 40 minutes, or for about 20 minutes. In some embodiments this preheating can be done while stirring.

Optionally, some methods can include annealing the oxide-affixed substrate. In some embodiments, the oxide-affixed substrate is annealed at between about 300° C. to about 450° C., or between about 350° C. to about 450° C., or at about 400° C. In some embodiments, the annealing is applied for a time period between 10 seconds and 1 hour, or about 5 minutes to about 45 minutes, or about 10 minutes to about 30 minutes, and/or about 30 minutes.

In some embodiments, sufficient batch amounts of the additives and the substrate desired to be coated, are placed within a reaction vessel. In some embodiments, the additives react in-situ to adhere directly upon the substrate surface.

In another embodiment, the method may be performed under standard atmospheric conditions.

A reducing additive includes any additive, such as a chemical compound or salt, that can reduce an oxidizing additive, and also includes any additive falling within the meaning of the term "reducing additive" commonly understood by one of ordinary skill in the art. A reducing additive may be solubilized in the oxide-forming reaction mixture, or it may not be solubilized in the oxide forming reaction mixtures. In some embodiments the reducing additive may comprise a metal and/or non-metal precursor.

A reducing additive may comprise an organic component. The organic component can be part or all of the reducing additive. Examples of suitable organic components can include, an amino acid, such as alanine, glycine, leucine, and/or valine; a hydrazide, such as hydrazine, carbohydrazide, diformyl hydrazine, tetraformyltrisazine, and/or hexamethylenetetramine. In some embodiments, the organic component is glycine.

A reducing additive may comprise a metal, such as a metal salt, including a metal salt of an organic acid, or an organometallic compound. In some embodiments the reducing additive may comprise the following metals or nonmetals: titanium, tungsten, cerium, tin, zinc, zirconium, bismuth, copper, indium, iron, silver, strontium, lithium, calcium, carbon, nitrogen and/or combinations thereof. In some embodiments the reducing metal precursor comprises an organic titanate.

A reducing additive may comprise a metal precursor. A precursor includes any substance that provides an element, or a chemical feature, to the oxide product. For example, metal precursor provides a metal to the oxide product. A reducing additive comprising a metal precursor may be referred to as a reducing metal precursor. A reducing metal precursor may be an organometallic compound or a metallic salt of an organic acid. In some embodiments, the reducing metal precursor may comprise a metal octoate.

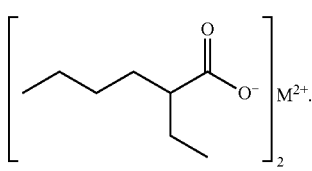

Wherein M can be Sn, Ni, Sr, Ba, Fe, Bi, V, Mo, W, Zn, Cu and/or combinations thereof. In another embodiment, the metal octoate may be tin (II) octoate.

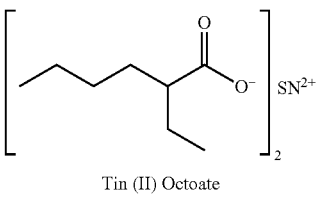

Tin (II) Octoate

In another embodiment, the reducing metal precursor comprises an organic titanate. In another embodiment, the organic titanate can be titanium (IV) bis ammonium lactate dihydroxide, ammonium oxo-oxalatotitanate (IV), hydroxycarboxylato-peroxotitanium, hydrocarboxylato-peroxotitanium, titanium lactate, titanium maleate, and/or titanium citrate. In another embodiment, the organic titanate can be selected from titanium (IV) bis ammonium lactate dihydroxide, ammonium oxo-oxalatotitanate (IV), hydroxycarboxylato-peroxotitanium, hydrocarboxylato-peroxotitanium, titanium lactate, titanium malate, and/or titanium citrate. In some embodiments, the organic titanate is titanium lactate.

In some embodiments, a metal containing precursor comprises Titanium(IV) bis(ammonium lactato)dihydroxide.

An oxidizing additive includes any additive, such as a chemical compound or salt, that can oxidize a reducing additive and also includes any additive falling within the meaning of the term "oxidizing additive" commonly understood by one of ordinary skill in the art. In some embodiments the solubilized oxidizing additive can be a compound separate and apart from the solubilized reducing additive. In another embodiment, the oxidizing additive and the reducing additive do not share a common chemical element. In another embodiment, the oxidizing additive and the reducing additive share a common chemical element. In another embodiment, the separate oxidizing additive can comprise a metal or nonmetal oxidizing precursor. In another embodiment, the separate oxidizing additive can comprise a dopant. In another embodiment, the oxidizing precursor can optionally be any one or more of ammonium perchlorate ($NH_4ClO_4$), ammonium nitrate ($NH_4NO_3$), ammonium chlorate ($NH_4ClO_3$), hydrogen peroxide ($H_2O_2$), and/or organic peroxides. In some embodiments, the organic peroxides can be ketone peroxides, diacyl peroxides, dialkyl peroxides, peroxyesters, peroxyketals, hydroperoxides, peroxydicarbonates, peroxymonocarbonates, and/or combinations thereof. In one embodiment, the oxidizing precursor is ammonium nitrate.

In another embodiment, the oxidizing additive may comprise an oxidizing compound, wherein the reducing additive contains a compound that has a calculated valence of at least 4 valence units different from a compound of the oxidizing additive. The valence can be calculated as described in Combustion Synthesis, Patil, Kashinath C; Aruna, Singanahally T, and Sambandan, Ekambaram, Current Opinion in Solid State & Materials Science, 2:158-165 (1997).

In some embodiments, a single substance or compound, such as a salt formed from an oxidizing agent and a reducing agent, can be both a reducing additive and an oxidizing additive. Thus, both oxidation and reduction could occur in the substance or compound, or the substance or compound could act as either a reducing additive or an oxidizing additive in an oxide-forming reaction mixture. Examples of salts formed from an oxidizing agent and a reducing agent include ammonium perchlorate ($NH_4ClO_4$), ammonium nitrate, ammonium chloride, ammonium peroxide. In some embodiments a separate oxidizing precursor is selected from hydrogen peroxide. In some embodiments a separate oxidizing precursor is selected from organic peroxides.

In some embodiments, the oxide affixed to the substrate may be a catalyst. In some embodiments, the oxide may be a metal oxide, such as a semiconductor or a photocatalyst. In some embodiments, the metal oxide may be doped or undoped. In some embodiments, the metal oxide may be a titanium oxide, tungsten oxide, cerium oxide, tin oxide, zinc oxide, zirconium oxide, bismuth oxide, copper oxide, indium oxide, iron oxide, silver oxide, strontium oxide, lithium oxide, calcium oxide, or a combination thereof. In some embodiments, the metal oxide may be $TiO_2$, $WO_3$, $CeO_2$, $SnO_2$, $ZnO$, $SrTiO_3$, $BaTiO_3$, $Fe_2O_3$, $LiVWO_6$, $AgVWO_6$, $In_2O_3$, $CaCuTi_3O_{12}$, $ZnFe_2O_4$, $ZrTiO_4$, $ZrTi_{0.75}Fe_{0.25}O_4$, $ZrTi_{0.90}Sn_{0.10}O_4$, $AgCa_2Zn_2V_3O_{12}$, $Zr_{0.95}Pr_{0.05}TiO_4$, $Bi_2O_3$, $Cu_2O$, $CuO$, $BiVO_4$, or a combination thereof.

In some embodiments the titanium in the metal oxide is instead comprised of tungsten, cerium, tin, zinc, zirconium, bismuth, copper, indium, iron, silver, strontium, lithium, calcium, carbon, and/or nitrogen. In some embodiments the metal dopant can independently be comprised of tungsten, cerium, tin, zinc, zirconium, bismuth, copper, indium, iron, silver, strontium, lithium, calcium, carbon, and/or nitrogen.

In some embodiments, the oxide is a mixed metal oxide. In some embodiments, the oxide is a non-metal oxide. In some embodiments, the oxide is a mixed metal and non-metal oxide. In some embodiments, the metal oxide can optionally be a titanium oxide, tungsten oxide, cerium oxide, tin oxide, zinc oxide, zirconium oxide, bismuth oxide, copper oxide, indium oxide, iron oxide, silver oxide, strontium oxide, lithium oxide, calcium oxide, and/or combinations thereof. In some embodiments, the non-metal oxide can optionally be a silicon oxide.

The metal oxide affixed to the substrate may comprise $Ti(C,N,O)_2$. In some embodiments the doped metal oxide affixed to the substrate may comprise $TiSn(C,N,O)_2$. In other embodiments the doped metal oxide affixed to the substrate may comprise $TiM(C,N,O)_2$, where M can be tungsten, cerium, tin, zinc, zirconium, bismuth, copper, indium, iron, silver, strontium, lithium, calcium, carbon, or nitrogen, or a combination thereof. In other embodiments the doped metal oxide affixed to the substrate might comprise $M^1M^2(C,N,O)_2$, wherein $M^1$ and $M^2$ can independently be tungsten, cerium, tin, zinc, zirconium, bismuth, copper, indium, iron, silver, strontium, lithium, calcium, carbon, or nitrogen.

In some embodiments, wherein the metal oxide is a $TiO_2$, the phase of $TiO_2$ is substantially anatase. In some embodiments, the amount of anatase phase relative to rutile phase is greater than at least 10% anatase, 20% anatase, 50% anatase, 80% anatase, 90% anatase, 95% anatase, and/or 99% anatase. In some embodiments, wherein the metal oxide is $TiSn(CNO)_2$, the dopant concentrations, e.g., the Sn, C and/or N remain substantially as nominally desired, e.g., $Ti_{0.85}Sn_{0.15}(O_{1.90}C_{0.05}N_{0.05})$.

The metal oxide may be those described in U.S. Provisional Application Ser. No. 61/587,889, filed Jan. 18, 2012, and U. S Patent Publication No. 2013/0192976, filed Jan. 14, 2013, published Aug. 1, 2013, which are incorporated by reference for their description of appropriate metal oxide materials.

For some oxides, such as catalysts, a dopant may improve the properties, such as catalytic properties, of the coating. A dopant precursor can be added to the solution containing the oxidizing additive and reducing additive. When the oxide-forming reaction mixture is heated, the resulting oxide coating can include dopant atoms from the dopant precursor.

A dopant can be any atom or combination of atoms that replaces an atom of the oxide to improve any relevant property of the oxide. Examples of useful dopant atoms can include Sn, C, N, etc. In some embodiments a dopant is Sn. In another embodiment a dopant is C. In another embodiment a dopant is N. In some embodiments, the dopant can be; titanium, tungsten, cerium, tin, zinc, zirconium, bismuth, copper, indium, iron, silver, strontium, lithium, calcium, carbon, nitrogen, or a combination thereof.

When a dopant precursor is included in an oxide-forming reaction mixture, it can be helpful if the resultant dopant concentration (Sn, C and/or N concentration) is at least 75% of the nominally desired dopant concentration after the synthesis process. In another embodiment, the resultant dopant concentration is at least 75% of the dopant concentration of an analogous particle material made by other conventional processes In some embodiments, the dopant concentrations remain at least 25%, 35%, 40% 50%, 66% of the desired nominally calculated amount. Diffuse reflectance spectra analysis can be one way to determine the retention of dopants in the affixed oxide.

In some embodiments, a metal precursor may provide the metal element of the oxide formed upon the substrate.

If the intended product is a doped metal oxide, the precursor may be a metal precursor, a dopant precursor, or a precursor for a nonmetal element. In some embodiments, wherein the desired end-product is a doped titanium oxide, the precursor may include Ti, O, or one or more desired dopant element. In some other embodiments, the desired dopant element may include Sn, C and/or N.

Generally, an additive can, does not need to, include any atoms that are incorporated into the intended product. An additive can participate in the overall reaction; for example, can be a reducing element/agent or oxidizing element/agent.

In some embodiments, the substrate is substantially non-porous. In some embodiments the substrate can be a polymer, a glass, or a sheet metal. In another embodiment, the substrate can be porous. In some embodiments the substrate can be mullite, pumice, concrete, and/or a ceramic metal oxide (e.g., alumina [$Al_2O_3$], silica, zirconia, ceria, hafnia).

Once an oxide coating is formed on a substrate surface by heating the substrate in the presence of a pre-coating mixture, the substrate having the oxide coating can be annealed. Annealing can remove the remaining or residual carbon and can increase the crystallinity of the oxide coating. The substrate can be annealed at any suitable temperature that can remove the remaining or residual carbon and increases the crystallinity of the oxide coating. In some embodiments, the oxide affixed substrate is annealed at about 300° C. to about 450° C., or about 350° C. to about 450° C., or at about 400° C. In some embodiments the annealing is applied for about 10 seconds to about 100 hours, about 10 seconds to about 1 hour, about 1 minute to about 100 hours, about 5 minutes to about 45 minutes, or about 10 minutes to about 30 minutes. In another embodiment the annealing is applied for a time period in a range bounded by, or between, any of these values.

Some embodiments include methods for affixing inorganic materials to substrates. This includes a method for forming an oxide coated substrate comprising contacting a solubilized reducing additive, a solubilized oxidizing additive and a substrate surface; heating the additives and substrate to synthesize an oxide coating thereon, the heating conducted at a temperature sufficiently high enough to exothermically react the additives and low enough to control the phase and composition of the metal oxide.

In one embodiment, as shown in FIG. 1, a method (S10) for forming an oxide affixed substrate is described which may comprise contacting a solubilized reducing additive, a solubilized oxidizing additive and a substrate surface, heating the additives and substrate to synthesize an oxide coating thereon (S20), the heating conducted at a temperature sufficiently high enough to exothermically react the additives and low enough to control the phase and composition of the metal oxide (S30). In other embodiments, the method may optionally provide an aqueous reducing additive solution; provide a separate oxidizing additive aqueous solution; and/or provide a substrate surface for forming the oxide thereon.

Some embodiments include a batch type production method. Reacting the materials may occur in a relatively static spatial relationship relative the heat source. Materials being reacted can be batch additives. Reacting the materials can occur in a reaction container. In some embodiments, reacting the additives and substrate in-situ forms the metal oxide upon the substrate surface.

In some embodiments, the reducing additive and the oxidizing additive are solubilized. The solvent may be aqueous and non non-aqueous solvents. The non-aqueous solvent can be a $C_{1-10}$ alcohol, a $C_{3-10}$ ketone and/or combinations thereof. The $C_{1-10}$ alcohol can optionally be methanol, ethanol, propanol, and/or butanol. The aqueous solvent can optionally be water. In some embodiments, the additives are aqueous.

The following documents are incorporated by reference herein in their entirety. U.S. Pat. Nos. 3,586,423; 4,300,819; 4,998,817; 5,363,152; 5,408,278; 5,774,202; 5,917,573; 6,135,595; 6,149,270; 6,811,258, 7,931,369, 8,314,049, U.S Publication Nos. 2006/0087062; 2007/0113881; WO2003/070640; U.S. Publication Nos. 2010/0062928 and 2012/0077668; and Patil, Kashinath C; Aruna, Singanahally T, and Sambandan, Ekambaram, Current Opinion in Solid State & Materials Science, 2:158-165 (1997).

EXAMPLES

A few embodiments are further shown by the following examples, which are intended to be illustrative of the embodiments of the disclosure, but are not intended to limit the scope or underlying principles in any way.

Example 1

Combustion Synthesis Approach to In-situ Loading of $Ti(O,C,N)_2$:Sn and $Ti(O,C,N_2)$ on Porous Ceramic (a) $TiSn(CNO)_2$ coated ceramic (Ex-1): 3.78 g of Tin(II) 2-ethylhexanoate [also known as tin(II) octoate and/or stannous octoate] (Spectrum Chemicals, Gardena, Calif., USA), 30 ml 50 wt % solution of Titanium(IV) bis(ammonium lactato)dihydroxide (titanium lactate, [Tyzor LA]) (Sigma Aldrich, St. Louis, Mo., USA), and 15.0 g of Ammonium nitrate ($NH_4NO_3$) (Sigma Aldrich, St. Louis, Mo., USA) were dissolved in about 25 ml of reverse osmosis (RO) purified water, then heated to about 150° C. and stirred for about 20 minutes.

An approximately 2×2 mm fragment of a mullite ceramic substrate (60% $Al_2O_3$+38% $SiO_2$) (MTI, Richmond, Calif., USA) was immersed in the resultant precursor mixture and then heated at about 350° C. for about 40 minutes in a preheated muffle furnace under ambient atmosphere and pressure conditions. The coated fragment was then removed from the reaction vessel and a first or top surface of the precursor covered substrate was placed in the preheated muffle furnace and then annealed at about 400° C. under ambient conditions for about 20 minutes. The ceramic was then rotated along it longest axis 180° degrees to expose the second surface and then annealed at about 400° C. for about additional 20 minutes.

Example 2 (Ex-2)

A sample of photocatalytically active powder was made in a manner similar to that described in Example 1, except that no support media (mullite) was inserted into the precursor mixture prior to heating and annealing.

Comparative Example 1 (CE-1)

An untreated mullite sheet of similar size and shape as described in Example 1 was provided as Comparative Example-1 (CE-1).

Comparative Example 2

Comparative Example 2 (CE-2) was 90 mg P25 powder (P25 Titania) obtained from Evonik (Evonik Degussa Corp., Parisippany, N.J., USA)]

Figure 2:
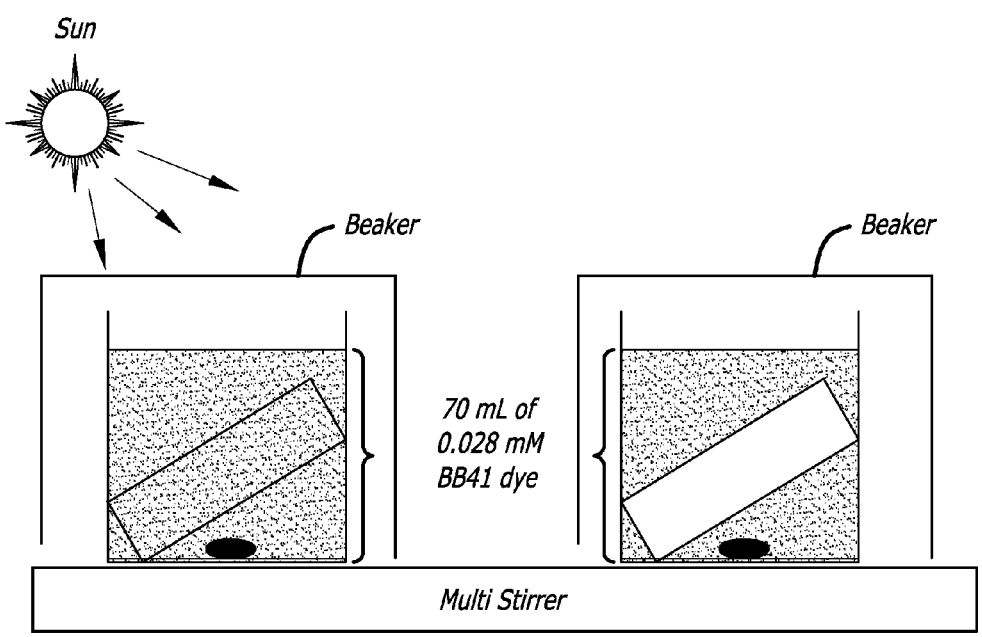
FIG. 2 is a schematic of an experiment described herein.
Figure 3:
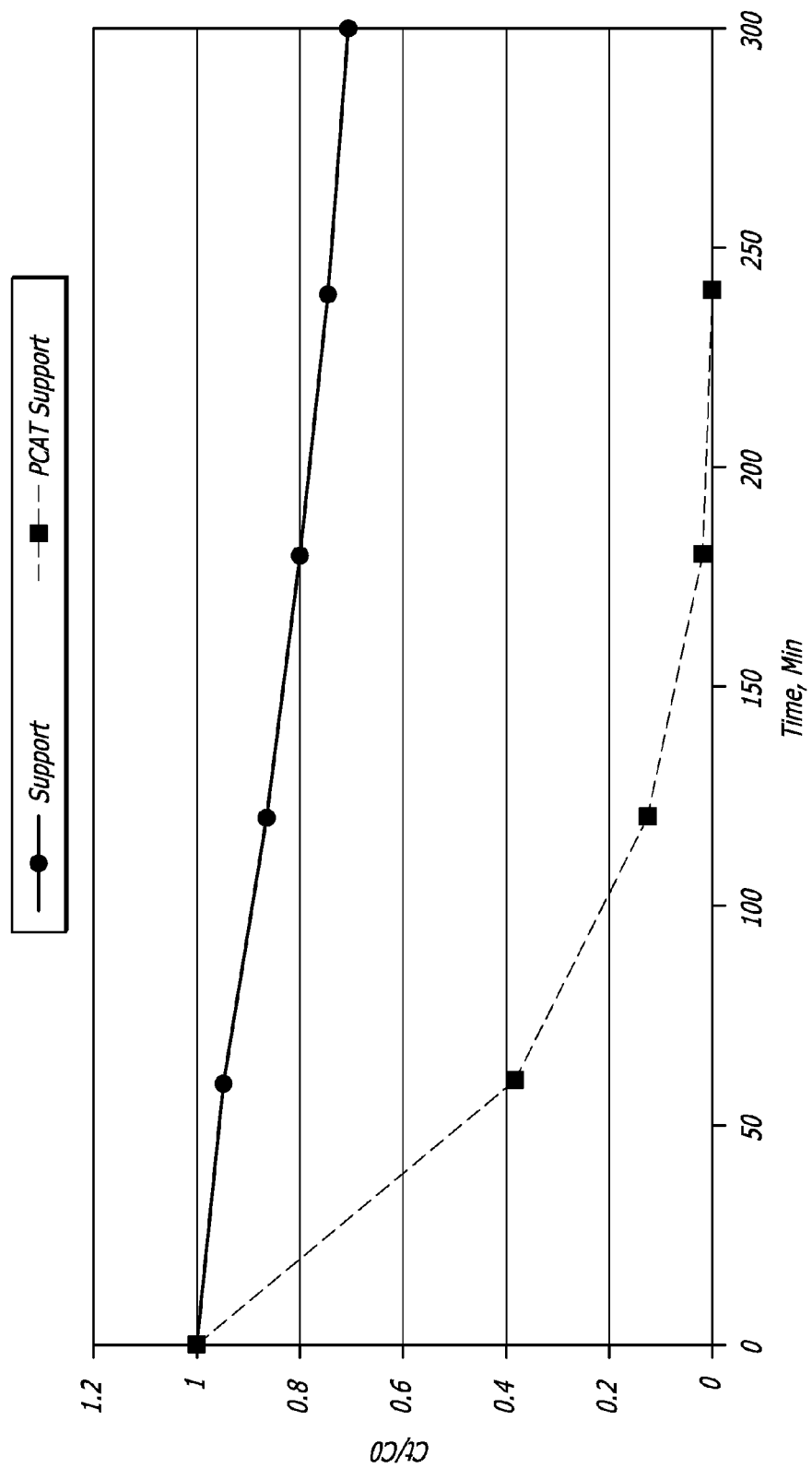
FIG. 3 shows the degradation of dye over time by an embodiment of an affixed substrate described herein as compared to the degradation of the dye by the substrate alone.
Figure 4:
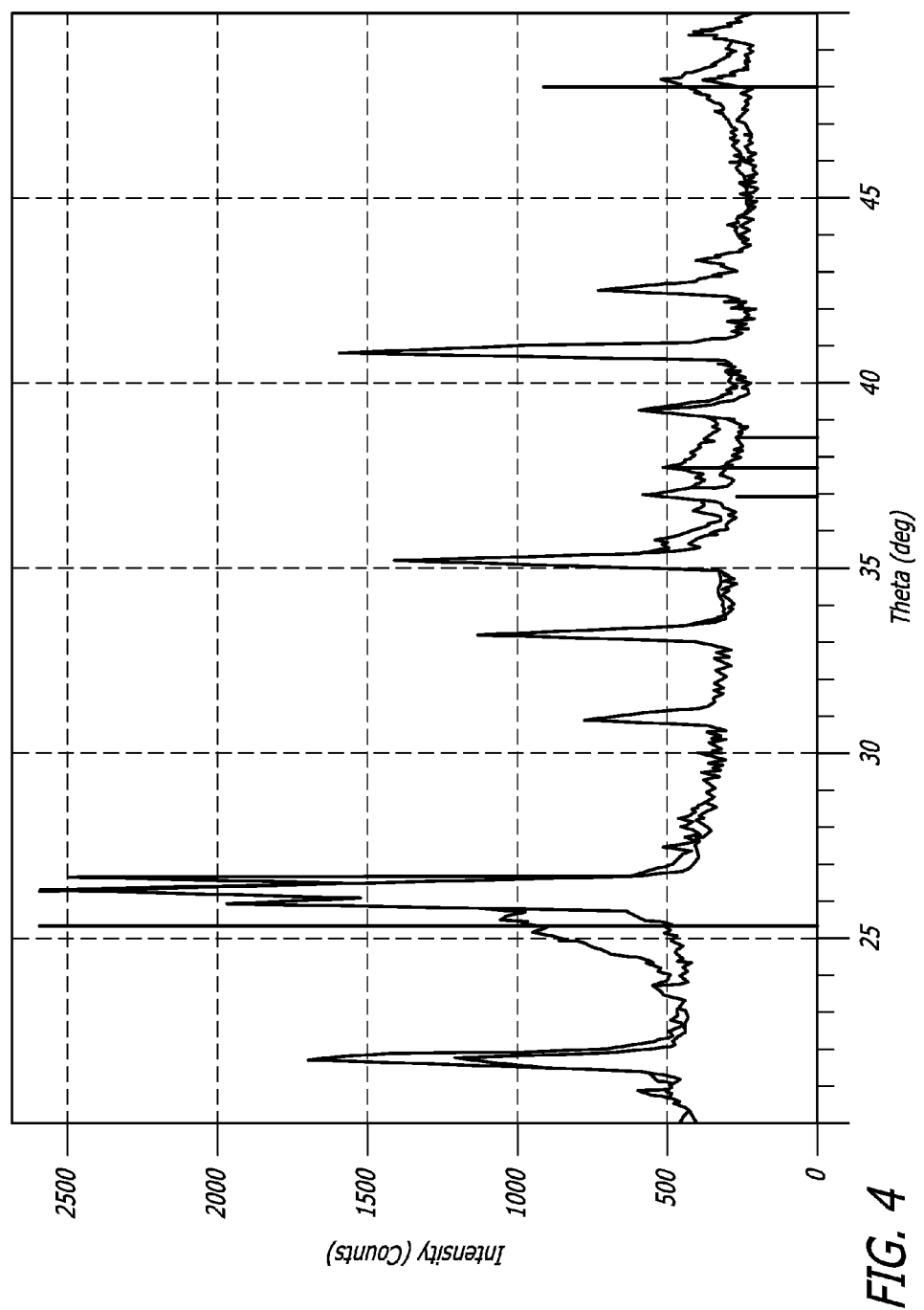
FIG. 4 shows the x-ray diffraction patterns of a substrate sample alone compared with an embodiment of a substrate affixed sample described.
Figure 5:
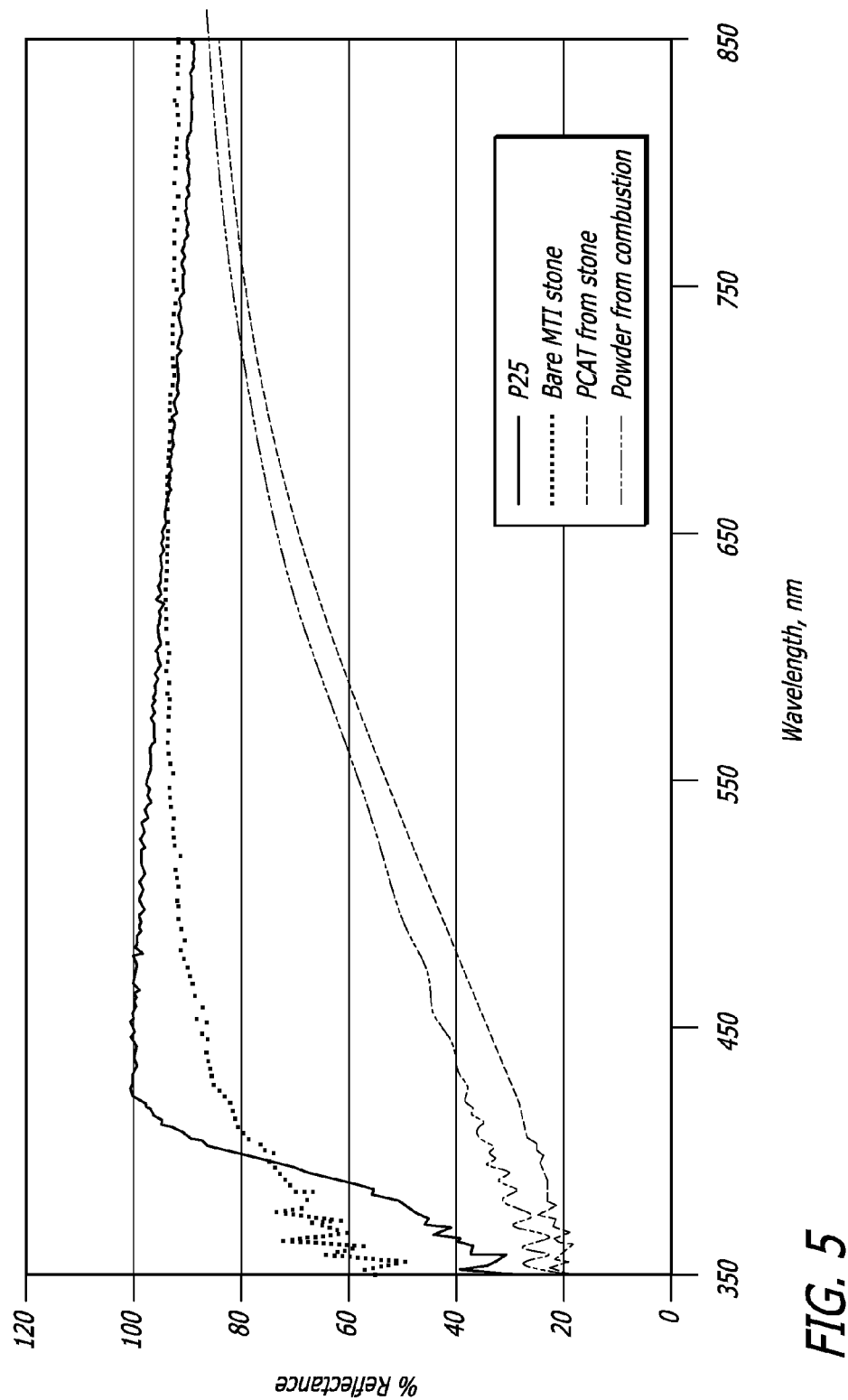
FIG. 5 shows the diffuse reflectance spectrogram comparing an embodiment of an oxide affixed substrate with that of the support only, a commercially available powder and the metal oxide powder.
Figure 6:
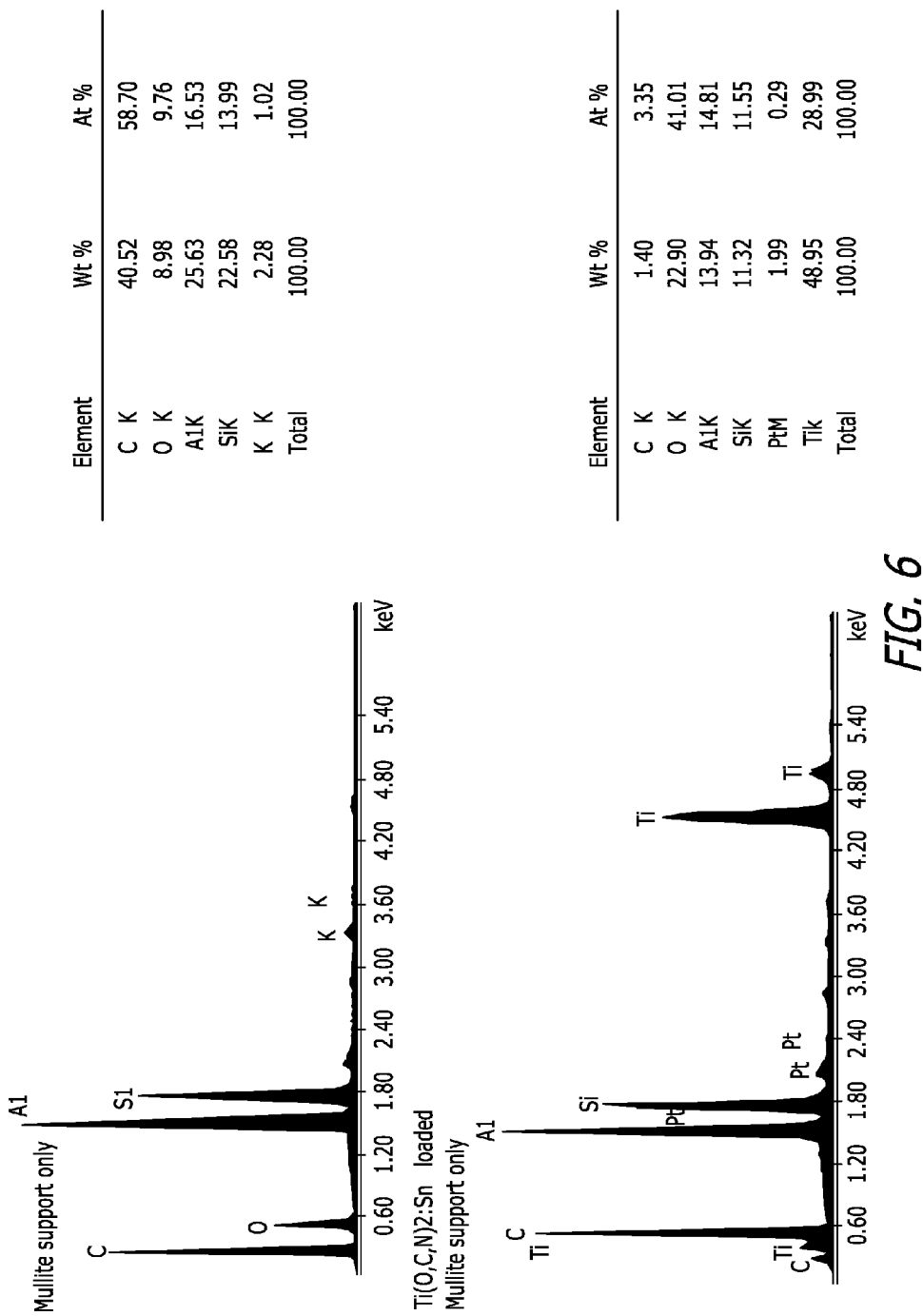
FIG. 6 shows the dispersive X-ray spectroscopy of an embodiment of an oxide affixed substrate and that of the substrate only.

Experimental Set-up for Photocatalysis Using Supported Ti(O,C,N)2:Sn:

As shown in FIG. 2, Ex-1 and CE-1 made as described in Examples (a) and (c) above, were placed in about 70 ml of Basic Blue 41 textile dye (BB41) (Sigma Aldrich, St. Louis, Mo., USA). Each sample was exposed to ambient sunlight on a clear day while continually stirring. At one hour intervals, 1 ml samples of each sample were taken and the dye concentration was determined by visual spectroscopy at about 620 nm (Cary-50, Spectrophotometer [Agilent Technologies, Santa Clara, Calif., USA). The results are shown in FIG. 3. As seen in FIG. 3, Ex-1 support element exhibited photocatalysis while CE-1 did not.
Characterization of Supported P-cats:
Powder XRD Characterization:

Powder samples of Ex-1 and CE-1 were also analyzed using powder x-ray diffraction using Cu K-alpha radiation (RigakuMiniflex II [Rigaku Americas, Woodland, Tex., USA]) with scan rate of 1° min. The result of the X-ray diffraction is shown in FIG. 4 as marked by blue lines confirms the presence of anatase phase. One spectra was confirmed as mullite as a major phase with silica and alumina as minor phases. The spectrum shows that the mullite support has silica major phase. In addition, examination of FIG. 4 confirms the presence of anatase $TiO_2$.
DRS Characterization:

Powder samples of Ex-1, Ex-2, CE-1 and CE-2 were analyzed using diffuse reflectance spectroscopy (DRS). The results are shown in FIG. 5 and indicate that tin doping improves absorption in the visible spectrum (400 nm to 800 nm), while CE-1 did not. Ex-1 ($Ti(O,C,N)_2$:Sn loaded mullite support) shows visible absorption, very similar to Ex-2 ($Ti(O,C,N)_2$:Sn powder). The anatase $TiO_2$ observed in the XRD pattern and visible absorption due to the doped anatase phase confirms the loading of anatase phase $Ti(O,C,N)_2$:Sn on the support.
SEM and EDS Characterization:

Powder samples of Ex-1 and Ce-1 were also analysed using energy dispersive X-ray spectroscopy (EDS). The results are shown in FIG. 6. The analysis of CE-1 showed the presence of aluminum and silicon. The analysis of Ex-1 confirmed the existence of titanium in addition to aluminum and silicon (FIG. 6).

Thus, loading or immobilization of an oxide material while maintaining the nominally desired doped nature of the oxide material on the support has been confirmed by XRD, DRS and EDS characterization.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used herein (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the claims and does not pose a limitation on the scope of any claim. No language in the specification should be construed as indicating any non-claimed element essential to the practice of a claim.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors. Of course, variations on these described embodiments will become apparent to those of ordinary skill in the art upon reading the foregoing description. The inventor expects skilled artisans to employ such variations as appropriate, and the inventors intend for the claims to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A method for forming an oxide coated substrate comprising:
    heating a pre-coating mixture in the presence of a substrate to synthesize an oxide coating on the substrate;
    wherein the pre-coating mixture comprises Titanium(IV) bis(ammonium lactato)dihydroxide and a solubilized oxidizing additive; and
    wherein heating is conducted at a temperature high enough to exothermically react the Titanium(IV) bis(ammonium lactato)dihydroxide and the solubilized oxidizing additive and low enough to control the phase and composition of the oxide.

2. The method of claim 1, wherein the oxide coated substrate surface product is annealed.

3. The method of claim 1, wherein the oxide coated substrate surface product is not annealed.

4. The method of claim 1, wherein the solubilized oxidizing additive comprises a metal or non-metal precursor.

5. The method of claim 1, wherein the solubilized oxidizing additive comprises ammonium perchlorate ($NH_4ClO_4$), ammonium nitrate, ammonium chlorate, ammonium peroxide, hydrogen peroxide or an organic peroxide.

6. The method of claim 1, wherein the solubilized oxidizing additive is ammonium nitrate.

7. The method of claim 1, wherein the substrate is porous.

8. The method of claim 1, wherein the substrate is substantially non-porous.

9. The method of claim 1, wherein the porous substrate comprises mullite, pumice or concrete.

10. The method of claim 1, wherein, prior to the addition of the substrate to the pre-coating mixture, the solubilized oxidizing additive and the Titanium(IV) bis(ammonium lactato)dihydroxide are preheated together at about 100° C. to about 200° C. for about 10 minutes to about 30 minutes.

11. The method of claim 1, wherein the substrate comprises a mullite ceramic.

12. The method of claim 1, wherein the substrate is immersed in the pre-coating mixture and heated at about 350° C. for about 40 minutes in a preheated furnace.

13. The method of claim 1, wherein the atmosphere and pressure conditions are ambient.

14. The method of claim 1, wherein the coated substrate is removed from the reaction vessel and the coated substrate is then placed into a preheated furnace and annealed at about 400° C. for about 20 minutes.

15. The method of claim 1, wherein the coated substrate is then rotated along its longest axis to expose the second surface, and then annealed at about 400° C. for about an additional 20 minutes.

16. The method of claim 1, wherein the pre-coating mixture is doped with a metal or non-metal precursor.

17. The method of claim 16, wherein the dopant comprises titanium, tungsten, cerium, tin, zinc, zirconium, bismuth, copper, indium, iron, silver, strontium, lithium, calcium, carbon, nitrogen, or a combination thereof.

18. The method of claim 16, wherein the oxide coating on the substrate comprises $TiSn(C,N,O)_2$.

19. The method of claim 16, wherein the oxide coating on the substrate comprises $Ti(C,N,O)_2$.

20. The method of claim 16, wherein the oxide coating on the substrate comprises $TiM(C,N,O)_2$, where M is tungsten, cerium, tin, zinc, zirconium, bismuth, copper, indium, iron, silver, strontium, lithium, calcium, carbon, or nitrogen, or a combination thereof.

* * * * *